United States Patent [19]
Wolfe et al.

[11] 4,297,061
[45] Oct. 27, 1981

[54] STEAM GENERATOR SHELL PARTING METHOD AND APPARATUS

[75] Inventors: Donald L. Wolfe, Hampton Township, Allegheny County, Pa.; Donald D. Modglin, Nashville; George J. Merrick, Franklin, both of Tenn.

[73] Assignee: Westinghouse Electric Corp., Pittsburgh, Pa.

[21] Appl. No.: 904,686

[22] Filed: May 10, 1978

[51] Int. Cl.³ .............................. B23C 1/20; B23C 3/02
[52] U.S. Cl. .................................. 409/131; 51/241 B; 51/241 S; 409/179
[58] Field of Search .................. 90/11 C, 12 R, 12 D, 90/15 R, 15 A; 29/157.3 R; 83/745; 51/241 B, 241 G, 241 S; 125/14; 219/125.11; 266/56, 76; 228/29, 45; 409/131, 179, 199

[56] References Cited
U.S. PATENT DOCUMENTS

| | | | |
|---|---|---|---|
| 2,842,238 | 7/1958 | Shaw et al. | 90/12 R |
| 3,688,615 | 9/1972 | Protze et al. | 409/178 |
| 3,910,480 | 10/1975 | Thatcher | 228/29 X |

FOREIGN PATENT DOCUMENTS 2344015 10/1977 France .

Primary Examiner—Z. R. Bilinsky
Attorney, Agent, or Firm—Daniel C. Abeles

[57] ABSTRACT

A method and apparatus for effecting within a nuclear power plant horizontal separation of the vertically-extending cylindrical wall of the shell of a steam generator by an accurate cutting technique that generates a weld accommodating profile in preparation for subsequent rejoining. This is attained by progressive installation of horizontal hinged-section tension band assemblies around the shell, adding vertical anchor members clamped to the bands at circumferential intervals therearound, hanging and locking track support brackets onto the anchor members, assembly of a multiple-section rigidized circular track onto the support brackets and around the shell, vertically and radially adjusting and locking the track in place, roller mounting a carriage-supported milling machine assembly on the track, and taking a series of tapered milling cuts in the shell wall while the milling machine assembly is moved along the track by use of gear teeth thereon.

4 Claims, 6 Drawing Figures

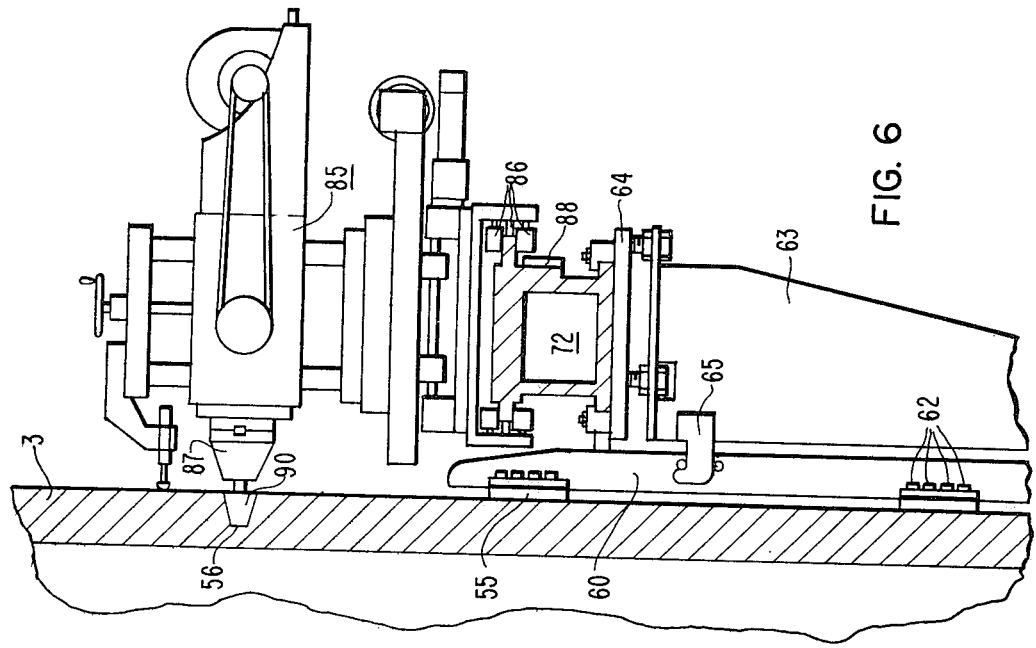
FIG. 6
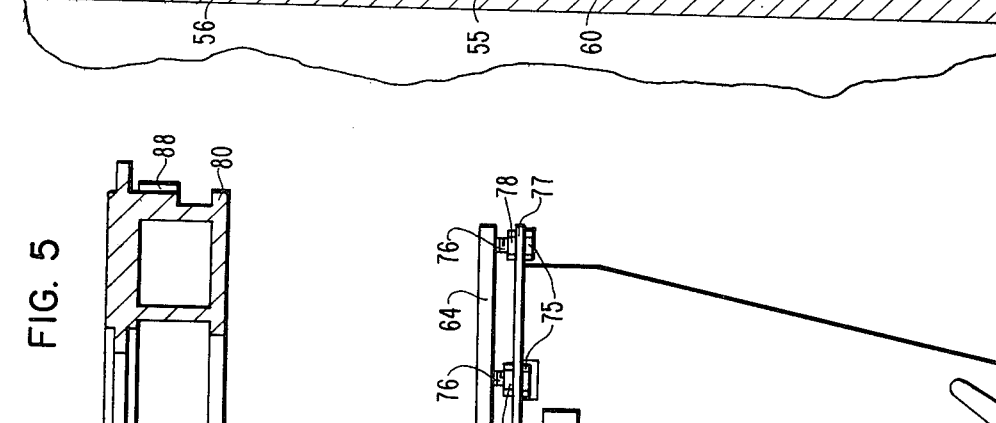
FIG. 5
FIG. 4
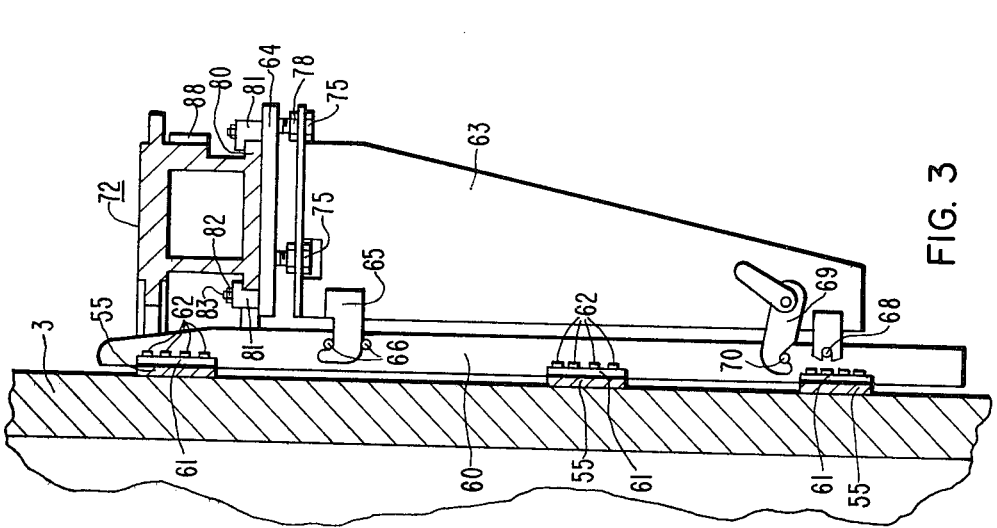
FIG. 3

STEAM GENERATOR SHELL PARTING METHOD AND APPARATUS

RELATED PATENT APPLICATIONS

Commonly-assigned U.S. Application Ser. No. 809,588, filed June 24, 1977 to A. A. Massaro and H. N. Andrews and commonly-assigned U.S. Application Ser. No. 834,855 filed Sept. 19, 1977 to R. A. Blanco and A. A. Massaro.

BACKGROUND OF THE INVENTION

This invention relates to apparatus for effecting retubing of a steam generator in a nuclear power plant.

Nuclear reactor power plants utilize a steam generator having a tube bundle to transfer heat from a primary side reactor-heated liquid to water on a secondary side to form steam for driving a turbine. Condenser leaks in the power plants have caused circulating water, which is often brackish, to mix with the secondary-side water in the steam generator, resulting in the build-up of undesirable chemicals in the tube bundle. Water treatment and blow-down have not completely protected the steam generator tubes from corrosion and leaks. As the number of tubes subject to such leaks increases, the desirability of replacement or repair of the steam generator increases. Since removal of a steam generator in its entirety from a nuclear power plant requires tearing out a large portion of a reinforced concrete containment vessel, replacement of such generator in its entirety becomes time consuming, expensive, and therefore undesirable.

SUMMARY OF THE INVENTION

The present invention is related in general to the replacement of the tube bundle in a steam generator while located in a nuclear power plant, and more particularly to a method and apparatus for effecting a horizontal separation in the vertically-extending cylindrical wall of the shell of a steam generator while disposed in a nuclear power plant and to do so with such a relatively high degree of accuracy and particularity that the separation cut in the shell results in a weld preparation profile to accommodate subsequent welding for rejoining the separated shell sections following installation of a replacement tube bundle. In effecting such shell separation a number of multiple section tension bands are first installed around the shell at intervals below the desired parting site. Flanged anchor members are installed at circumferential intervals in vertical extension between the tension bands by use of flange-clamping brackets on the bands. Outwardly projecting support brackets with vertically-adjustable horizontal support blocks atop their upper ends are hooked onto the anchor members and clamped in place. Multiple arcuate sections of a thick-wall box-beam circular track are bolted together at flanged ends while being placed in horizontal extension onto the support blocks atop the support brackets. After completion of assembly of the circular track around the shell, the support blocks are adjusted vertically for true-up and proper track position by screw thread adjustment of support nuts on vertical support bolts extending between the support blocks and brackets. After adjustment in horizontal positioning of the track assembly for concentricity with the steam generator shell, bottom flanges on such track assembly are clamped in place by use of clamping lugs, nuts, and bolts with square heads slidably mounted in open-top T-slots extending lengthwise on the support blocks. Finally, the carriage-mounted milling cutter machine such as an LC5 Master-Rise Fall Milling Machine is mounted on the track with guide rolls introduced to top, bottom and edge surfaces on the track at its inner and outer circumferential edges. The cutting machine includes vertical and horizontal adjustment of a rotary milling cutter head toward and away from the shell wall. A motor-driven gear cooperates with a ring gear formed on the outer edge of the track assembly for movement about the shell. By use of different sized taper tools, a tapered weld-preparation cut may be made through the shell wall to permit removal of a top shell part for access to the tube bundle within the lower part.

Still other features and advantages of the invention will become apparent from subsequent and more detailed description of the invention when taken in connection with the accompanying drawings in which:

FIG. 3 is a vertical section view of the track and support assembly therefor in affiliation with the outer wall of the cylindrical steam generator shell;

FIG. 4 is a side elevation view of a support bracket and block assembly employed in multiples in the apparatus of the present invention;

FIG. 5 is a section view of an arcuate track section;

FIG. 6 is an elevation view partly in outline and partly in section showing the apparatus of the present invention including the milling cutter machine and its carriage affiliated with a section of the steam generator shell.

DESCRIPTION OF THE PREFERRED EMBODIMENT

Figure 1:
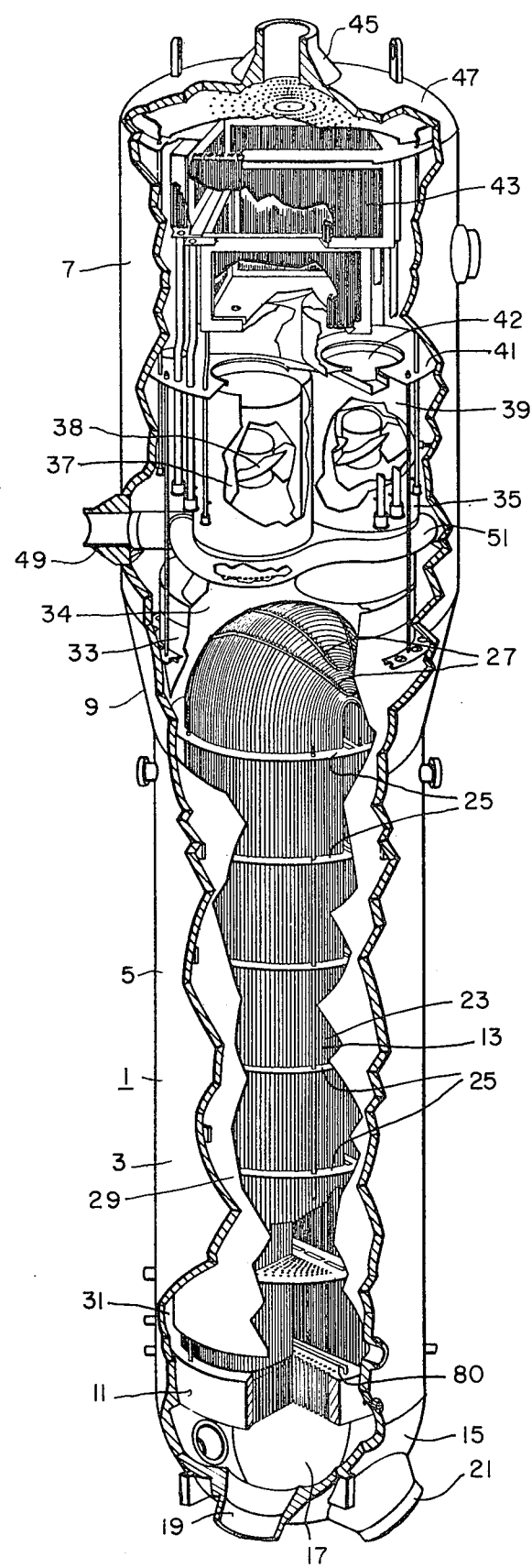
FIG. 1 is a vertical perspective view of a nuclear power plant steam generator shown partially in section.
Figure 2:
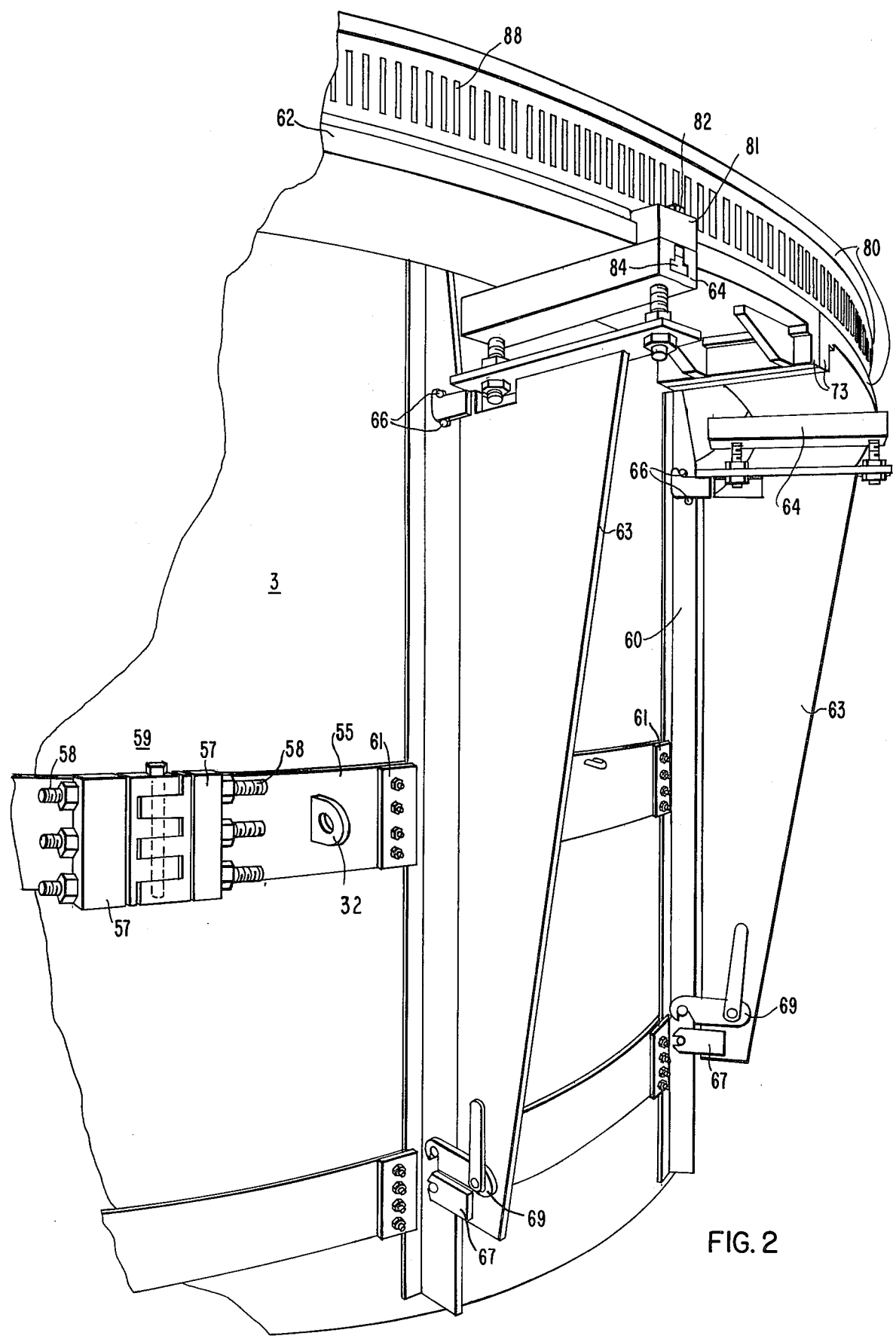
FIG. 2 is a vertical perspective view showing in outline a portion of the apparatus of the present invention as affiliated with the outer wall of the cylindrical shell of a steam generator, as observed from a position beneath the track portion of such apparatus.

Referring to FIG. 1 in the drawings, the steam generator 1 with which the shell parting apparatus of the present invention is intended to be employed in connection replacement of the tube bundle 23 therein typically includes a vertically oriented shell 3, that comprises a lower cylindrical portion 5 and an upper cylindrical portion 7, larger in diameter than the lower portion 5, and a frustoconical transition portion 9 joining the lower and upper portions 5 and 7. A tube sheet 11 is disposed in the lower end of the lower portion 5 of the shell 3 and has a plurality of holes for accommodating the ends of U-shaped tubes 13 which extend upwardly from the tube sheet 11 and are closely packed to form the tube bundle 23 disposed vertically within the lower portion 5 of the shell 3.

A hemispherical channel head 15 is fastened to the tube sheet 11 and has a divider plate 17 disposed therein. A primary fluid inlet nozzle 19 supplies heated affluent primary fluid from a nuclear reactor core (not shown) to one portion of the channel head 15 and a discharge nozzle 21 is disposed in the channel head 15 to return the affluent primary fluid to such reactor core.

A plurality of support plates 25 are disposed throughout the tube bundle to support the tubes 13 at various locations along their length to reduce flow-induced vibrations. Anti-vibration bars 27 are also disposed adjacent to the bends in the tubes 13 to prevent vibration in this portion of the tube bundle 23.

A wrapper or sleeve 29 is disposed between the tube bundle 23 and the shell 3 so as to form an annular space 31 therebetween. The upper end of the wrapper 29 is enclosed by a domed cap 33 which has a plurality of openings 34 disposed therein in fluid communication with centrifugal moisture separators 35. The centrifugal moisture separators 35 are made up of two portions, a lower portion 37 formed from a cylindrical member encircling a plurality of swirl vanes 38 and an upper sleeve portion 39 which is fastened to an orifice plate 41 which has orifices 42 that register with the sleeve portions 39 to permit steam that has centrifugally shed some of its entrained moisture to enter the upper portion of the steam generator.

A second stage moisture separator 43 is disposed in the upper portion of the steam generator for removing the remaining moisture from the steam before it enters a steam outlet nozzle 45 centrally disposed in an upper dished head 47 which encloses the upper end of the steam generator.

A feedwater inlet nozzle 49 and feedwater distribution ring 51 are disposed in the lower end of the enlarged portion or upper portion of the steam generator adjacent to the transition member 9.

The previously referenced copending commonly-owned patent applications Ser. No. 809,588 and 834,855 disclose methods for effecting removal of the tube bundle 23 from a steam generator 1 while located in a nuclear power plant that involves an early step of making a circumferential cut through the wall of the shell 3 such as by grinding and involving the use of a circumferential track and automatic drive means. No further details directed particularly to such shell cutting are set forth in these copending patent applications. The present invention is intended to satisfy the need for effecting the cutting step referred to briefly in such patent applications.

Referring to FIGS. 2 to 6 in the drawing, in accord with a preferred method and apparatus of the present invention, a number of multiple sectioned tension bands 55 are first installed around the steam generator shell 3 at intervals below the desired parting site 56. Each of the bands 55 is in multiple sections having connecting blocks 57 disposed on their exterior surface at their opposite ends. The ends of the several band sections are joined together by connecting bolts 58 emanating from a pin-connected hinge 59 disposed between adjacent pairs of securing blocks. The bands are thereby drawn taut around the outer wall of the cylindrical steam generator shell 3 for tightly clamped attachment thereto. Eye members 32 are attached to the tension band sections to facilitate the initial handling thereof by way of an overhead crane (not shown).

Flanged anchor members 60 are installed at circumferential intervals in vertical extension between the tension bands 55 by use of flange-clamping brackets 61 held in place by stud bolts 62 welded onto the bands 55.

Outwardly projecting support brackets with vertically adjustable horizontal track support blocks 64 atop their upper ends are supported at their upper ends by hook members 65, passed between pins 66 attached to the anchor members 60. The lower ends, once the upper ends are hooked in place by suitable angular introduction of the hook 65 between the pins 66, abut pins 68 attached to the lower end of the anchor member 60 through the medium of pads 67 at the bottom of the support brackets 63; such pads 67 being grooved to fit over the pins 68. Once so positioned, the support brackets 63 are locked in place by cam-lever-operated locking clamps 69 fit over locking pins 70 attached to the anchor member 60. When in place in securement to the anchor member 60 the plurality of supporting brackets are then distributed at intervals circumferentially around the bands 55 and in vertical extension therebetween while projecting outwardly in a radial direction to present a circular array of track support blocks 64 at their uppermost ends.

Multiple arcuate sections of a thick-wall box-beam circular track 72 are bolted together at end flanges 73 while being placed in horizontal extension onto the support blocks 64 atop the support bracket 63. After completion of assembly of the circular track 72 around the shell 3, the support blocks 64 are adjusted vertically for true-up and proper track positioning by screw threaded adjustment of support nuts 75 on vertical support stud bolts 76 attached to and extending downwardly from the support blocks 64. A top flange 77 on the brackets 63 has openings for the stud bolts 76 and offers a shoulder for the support nuts 75. Lock nuts 78 on top of the flanges 77 and in screw threaded attachment with the stud bolts 76 can be tightened after the nuts 75 are properly positioned.

After adjustment in horizontal positioning of the track assembly 72 for concentricity with the steam generator shell 3, bottom flanges 80 on such track assembly are clamped in place by use of clamping lugs 81, nuts 82 and bolts 83. The bolts 83 have square heads at their lower ends that are slidably mounted on open-top T-slots 84 that extend lengthwise of the support blocks 64.

Finally, the carriage-mounted milling cutter machine 85 is mounted on the track 72 with guide rolls 86 introduced to top, bottom, and edge surfaces on the upper portion of the track 72 at its inner and outer circumferential edges. The cutting machine 85 includes means for enabling vertical and horizontal adjustment of a rotary milling cutter head 87 toward and away from the shell wall 3. A motor driven gear cooperates with the teeth of a ring gear 88 formed on the outer edge of the track assembly for effecting movement of the milling cutter machine 85 about the shell 3. By use of suitable tools 90, a weld-preparation cut 56 may be made through the shell wall 3 to permit removal of a top part of such shell for access to the tube bundle 23, FIG. 1, therein.

What is claimed is:

1. Method for effecting horizontal separation of the vertically-extending shell of a steam generator, comprising the steps of:
    installing a plurality of hinged-section tension bands at vertical intervals around said shell,
    adding vertically extending anchor members clamped to the bands and distributed circumferentially therearound,
    hanging and locking track support brackets onto the anchor members,
    assembling, locating, and securing a multiple-section rigidized circular track onto the support brackets, and
    utilizing a milling machine assembly roller guided and supported by such track to cut through said cylindrical shell around its circumference.

2. The method of claim 1, wherein a carriage for said milling machine assembly is locked to a section of said track during track assembly.

3. Apparatus for effecting a seam around the circumference of a vertically extending cylindrical shell of a steam generator, comprising:
- a plurality of vertically-separated tension bands each having bolt-and-hinge interconnected circumferential sections,
- a plurality of elongated anchor members extending vertically between said tension bands, distributed circumferentially therearound, and attached thereto,
- a plurality of track support bracket assemblies hook-supported and clamping-locked onto said anchor members in projection therefrom radially of said shell,
- a rigid multiple-section bolted-together track secured to the top of said support bracket assemblies, wherein said track support bracket assemblies include vertically adjustable track support blocks on which said track rests, said support blocks having open-top T-slots opening inwardy from opposite ends, and wherein said track is secured to the tops of said support blocks via bolts having square heads anchored in said T-slots, and
- a carriage-mounted machining tool roller guided and supported by said track.

4. The apparatus of claim 3, wherein said track is of hollow box shape in cross-section with inner and outer circumferential flanges at its bottom to accommodate clamping atop said bracket assemblies and with inner and outer circumferential machined flanges at its top to accommodate accurate cooperation with guide and support rolls for said machining tool.

* * * * *